(12) United States Patent
Ocampo et al.

(10) Patent No.: US 7,278,736 B2
(45) Date of Patent: Oct. 9, 2007

(54) CONTACT LENSES IMPARTING A VIVACIOUS APPEARANCE TO THE EYE

(75) Inventors: Gerardo Ocampo, Bridgeview, IL (US); Michael Quinn, Valparaiso, IL (US); Barry Atkins, Chicago, IL (US)

(73) Assignee: Novartis AG, Basel (CH)

( * ) Notice: Subject to any disclaimer, the term of this patent is extended or adjusted under 35 U.S.C. 154(b) by 160 days.

(21) Appl. No.: 11/065,145

(22) Filed: Feb. 23, 2005

(65) Prior Publication Data

US 2005/0185134 A1    Aug. 25, 2005

Related U.S. Application Data

(60) Provisional application No. 60/547,701, filed on Feb. 25, 2004.

(51) Int. Cl.
*G02C 7/04*        (2006.01)
(52) U.S. Cl. .................................. 351/162; 351/177
(58) Field of Classification Search ................ 351/162, 351/177, 160 R, 160 H, 161
See application file for complete search history.

(56) References Cited

U.S. PATENT DOCUMENTS

| | | | |
|---|---|---|---|
| 3,536,386 A | 10/1970 | Spivak | 351/160 |
| 3,679,504 A | 7/1972 | Wichterle | 156/62 |
| 3,712,718 A | 1/1973 | LeGrand et al. | 351/160 |
| 4,405,773 A | 9/1983 | Loshack et al. | 526/317 |
| 4,460,523 A | 7/1984 | Neefe | 264/1.9 |
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshaek | 8/507 |
| 4,719,657 A | 1/1988 | Bawa | 8/453 |
| 4,744,647 A | 5/1988 | Meshel et al. | 351/177 |
| 4,811,662 A | 3/1989 | Sterman | 101/170 |
| 4,954,132 A | 9/1990 | Hung et al. | 8/507 |
| 5,034,166 A | 7/1991 | Rawlings et al. | 264/1.7 |
| 5,116,112 A | 5/1992 | Rawlings | 351/162 |
| 5,120,121 A | 6/1992 | Rawlings et al. | 351/162 |
| 5,414,477 A | 5/1995 | Jahnke | 351/162 |
| 5,793,466 A | 8/1998 | Moncada | 351/162 |
| 5,936,705 A | 8/1999 | Ocampo et al. | 351/162 |
| 6,030,078 A | 2/2000 | Ocampo | 351/162 |
| 6,132,043 A | 10/2000 | Atkins et al. | 351/162 |
| 6,164,777 A | 12/2000 | Li et al. | 351/162 |
| 6,196,683 B1 | 3/2001 | Quinn et al. | 351/162 |
| 6,337,040 B1 | 1/2002 | Thakrar et al. | 264/1.7 |

(Continued)

FOREIGN PATENT DOCUMENTS

EP        1 262 307 A2       4/2002

(Continued)

*Primary Examiner*—Scott J. Sugarman
(74) *Attorney, Agent, or Firm*—Sheng-Hsin Hu; Jian Zhou

(57) ABSTRACT

The invention is directed to a colored contact lens designed for modifying or enhancing a wearer's eye color while giving the wearer's eyes an improved lively appearance (or more lively or vivacious appearance). In particular, a colored contact lens of the invention may impart to a wearer's eye color both a natural appearance with an emotional dimension such as sophistication, depth, well-being, honesty with intimacy, or combinations thereof. The invention also provides methods and kits for making a colored contact lens of the invention.

37 Claims, 9 Drawing Sheets

U.S. PATENT DOCUMENTS

| | | |
|---|---|---|
| 6,494,575 B1 | 12/2002 | Jahnke ........................ 351/162 |
| 6,523,953 B2 | 2/2003 | Jahnke ........................ 351/162 |
| 6,634,747 B1 * | 10/2003 | Atkins et al. ............ 351/160 R |
| 2003/0030773 A1 | 2/2003 | Ocampo ...................... 351/162 |
| 2003/0184710 A1 | 10/2003 | Tucker ........................ 351/162 |
| 2004/0119939 A1 * | 6/2004 | Clark et al. .................. 351/162 |

FOREIGN PATENT DOCUMENTS

| | | |
|---|---|---|
| WO | WO 01/96908 | 12/2001 |

* cited by examiner

CONTACT LENSES IMPARTING A VIVACIOUS APPEARANCE TO THE EYE

This application claims the benefit under 35 USC § 119 (e) of U.S. provisional application No. 60/547,701, filed Feb. 25, 2004, incorporated by reference in its entirety.

This invention relates to contact lens manufacture, the lenses made thereby, and more particularly to a contact lens which imparts vivacious appearance to an eye when the lens is placed on the eye.

BACKGROUND OF THE INVENTION

Colored contact lenses have been used to modify or enhance the color of a wearer's eyes. In general, there are two types of colored contact lenses. The first are contact lenses which use essentially transparent enhancement colors that allow the color of the natural iris to show through but combine with that natural color to produce a new appearance. Such tinted lenses are typically used to enhance or augment the appearance of a lightly colored eye. This class of colored lenses may not be able to change an underlying dark colored, brown iris to blue. The second category is the class of opaque colored lenses having a continuous opaque pattern that fully covers the iris or having an intermittent opaque pattern that does not fully cover the iris. Opaque colored contact lenses can effectively and substantially modify the wearer's eye color.

Some cosmetic lens wearers prefer a colored contact lens that provides a natural appearance while improving and/or modifying the color of the iris or its texture. The appearance of an iris is relatively complex, showing multiple colors and textures (see, for example, Jahnke, U.S. Pat. No. 5,414,477). The appearance of the natural iris is not a simple solid color, but a structure comprising many lines and different colors. For these wearers, the more natural their eyes appear with the lens, the more appealing they find the cosmetic effect of the lens. Over the years many attempts have been made to produce an opaque lens with a natural appearance (see, for example, U.S. Pat. No. 3,536,386 to Spivak; U.S. Pat. No. 3,679,504 to Wichterle; U.S. Pat. No. 3,712,718 to LeGrand, U.S. Pat. No. 4,460,523 to Neefe, U.S. Pat. No. 4,719,657 to Bawa, U.S. Pat. No. 4,744,647 to Meshel, et al., U.S. Pat. No. 4,634,449 to Jenkins; U.S. Pat. No. 4,582,402 to Knapp; U.S. Pat. No. 5,414,477 to Jahnke; U.S. Pat. No. 5,120,121 to Rawlings; U.S. Pat. No. 5,793,466 to Moncada; EP Publication No. 0 309 154; European Patent No. 0 472 496 A2; and U.K. Patent Application No. 2 202 540 A).

Opaque colored contact lenses, which can provide a natural appearance, are generally produced by printing an ink-containing pigment (or pigments) to the surface of the lens. This can be done by printing the ink directly on the surface of the lens, or on a casting cup which then transfers the printing to the lens. These pigments are conventional pigments that absorb and reflect light to give a cosmetic effect. Texture, for instance, is achieved by choosing the pattern(s) in which the ink is applied to the lens surface, and the number of ink colors applied. However, pigments used for producing current opaque contact lenses have limited or no characteristics other than direct absorption or reflection of light. These lenses can not provide cosmetic effects that may have appeal such as a perception of depth, and unusual textural effects.

U.S. Pat. No. 6,196,683 to Quinn and Atkins discloses pearlescent contact lenses that give the cosmetic effects that many consumers may want, and attempting to achieve cosmetic effects that may have appeal such as a perception of depth, and unusual textural effects. However, the Quinn and Atkins patent does not disclose or suggest a contact lens designed for giving the wearer's eyes both a natural appearance and a more lively or vivacious appearance, which some consumers may want.

SUMMARY OF THE INVENTION

It is a principal objective of this invention to provide an improved contact lens through selective application of pearlescent colorants to the surface of the lens to give both a natural appearance and a vivacious cosmetic appearance to an eye.

In one respect, the invention provides a contact lens comprising a non-opaque pupil section, an iris section surrounding the pupil section, and a non-opaque peripheral section surrounding the iris section, wherein the iris section includes an intermittent pattern of pearlescently colored elements and a dark limbal ring surrounding the intermittent pattern, wherein the intermittent pattern and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern.

In another aspect, the invention encompasses a method for making a colored contact lens having a pupil section, an iris section surrounding the pupil section, and a peripheral section surrounding the iris section, comprising the steps of: providing a non-opaque contact lens; and printing, in no particular order on the surface of the iris section of the contact lens, an intermittent pattern of pearlescently colored elements with at least one pearlescent colorant and a dark limbal ring with a dark colorant free of pearlescent pigment, wherein the intermittent pattern of pearlescently colored elements and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern.

In a still further aspect, the present invention provides a kit for making a colored contact lens. The kit of the invention comprises: (a) at least one pearlescent ink for printing of an intermittent pattern of pearlescently-colored elements onto the iris section of a non-opaque contact lens, wherein the pearlescent ink includes at least one pearlescent pigment in an amount sufficient to provide to the iris section of a non-opaque contact lens a desired amount of pearlescence, luster, semi-opacity, or combination thereof but insufficient to impart an unnatural appearance to a wearer's eye color; (b) a non-pearlescent dark ink for printing a limbal ring onto the iris section of the non-opaque contact lens, wherein the dark ink is free of any pearlescent pigment, wherein the limbal ring surrounds the intermittent pattern and has a substantially even circular border or an uneven border with the intermittent pattern, wherein the combination of the intermittent pattern and the limbal ring is capable of modifying and/or enhancing a wearer's eye color when the colored contact lens is worn by the wearer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1A:
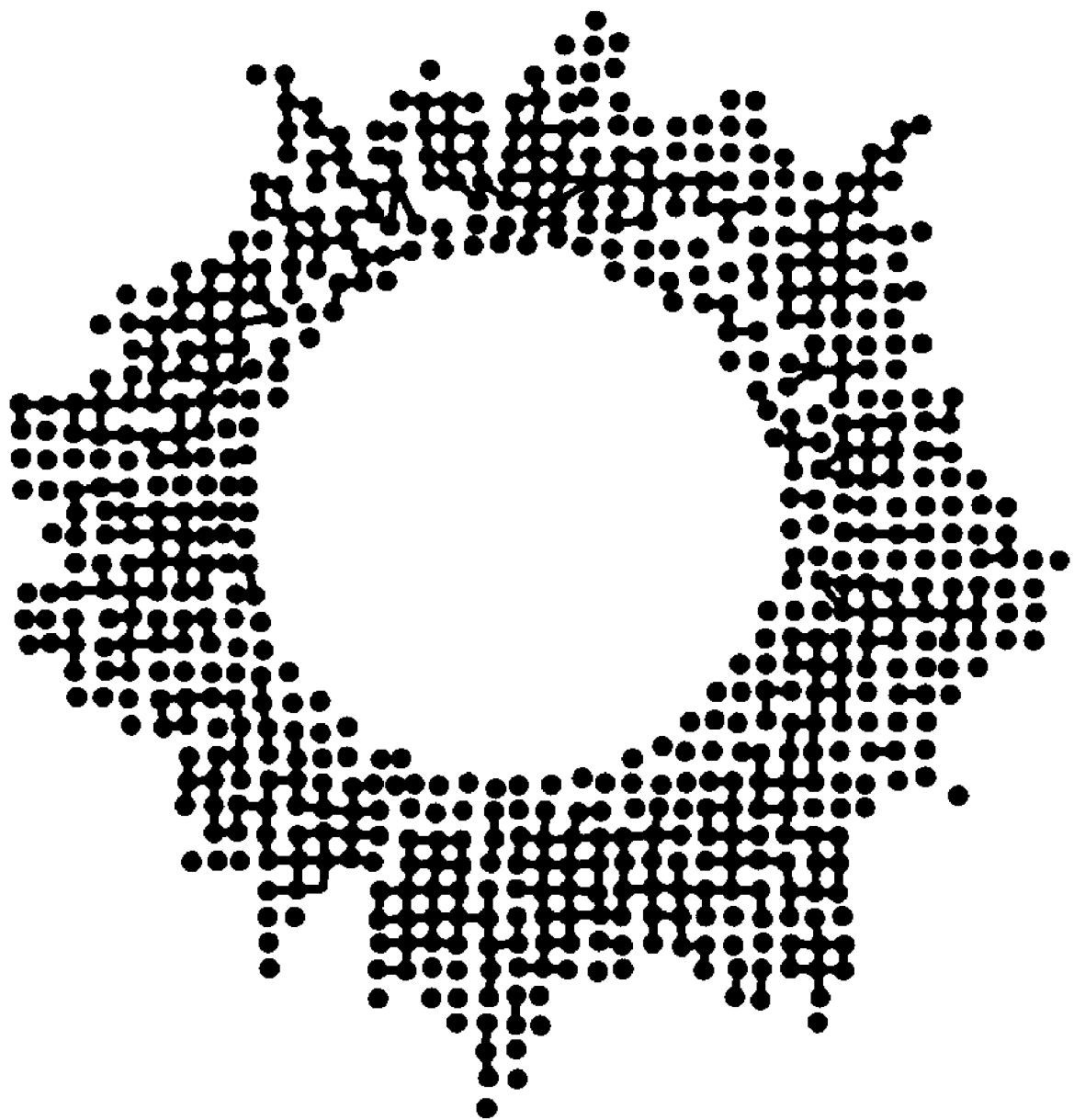
FIGS. 1A and 1B illustrate an intermittent pattern of pearlescently colored elements in accordance with a preferred embodiment of the invention: a first (inside) portion of pearlescently colored elements of a first shade (FIG. 1A) and a second (outside) portion of pearlescently colored elements of a second shade (FIG. 1B).

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The term "ordinary viewer" is intended to mean a person having normal 20/20 version standing about 5 feet from a person wearing the lenses of the invention.

The term "non-opaque" as used herein is intended to describe a part of the lens that is uncolored or colored with translucent coloring.

The term "eye color" refers to the color of the iris.

A "colorant" means either one or more dyes or one or more pigments or a mixture thereof that is used to print a pattern of colored elements on a contact lens.

"Dye" means a substance that is soluble in a solvent and that is used to impart color. Dyes are typically translucent and absorb but do not scatter light. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom D M Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which preferably are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allows the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects. There are other methods to make pearlescent pigments such as metallizing thin strips of plastic.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Georgia, the pigments having the trade name "Flonac Lustre Colors"; and EM Industries, Inc. of Hawthorne, N.Y., the pigments having the trade name "Affair Lustre Pigments".

The term "pearlescently colored" as used herein is intended to describe an element of the intermittent pattern that is colored with a pearlescent colorant (i.e., containing at least one pearlescent pigment).

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of the metal oxide coated layer, fragmentation of platelets, platelet agglomeration and platelet compaction. Delamination of metal oxide, compaction, fragmentation and agglomeration will reduce pearlescent effects.

An "uneven or jagged or irregular border" as used herein refers to a border on which positions have radial distances (i.e., from the lens center) which differ from each other by at least about 10%. A "substantially even border" as used herein refers to a border on which positions have substantially constant radial distances (i.e., from the lens center), namely differing from each other less than 10%.

The term "second shade different from said first shade" as used herein is intended to mean that both shades are of totally different colors, such as blue and hazel; or that both shades are the same basic color, but having different intensities such as light blue and dark blue.

The term "an improved lively appearance" as used herein is intended to describe a natural appearance with emotional dimension added therein, which is provided by a colored contact lens and characterized by pearlescence, luster and/or semi-opacity imparted on a wearer's eye color noticeable to an ordinary viewer.

"Hydrogel" means a cross-linked polymer having an equilibrium content between about 10 and 90 percent water.

A "lens-forming material" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

The term "olefinically unsaturated radicals" is employed herein in a broad sense and is intended to encompass, for example, vinyl compounds, acrylic compounds, and methacrylic compounds. A free radical can be introduced into the olefinically unsaturated group-containing compounds using standard initiating agents, such as a photo or thermal initiator.

In general, the invention is directed to a colored contact lens designed for modifying or enhancing a wearer's eye color while giving the wearer's eyes an improved lively appearance (or more lively or vivacious appearance). In particular, a colored contact lens of the invention may impart an emotional dimension upon a wearer's eye color: sophistication, depth, well-being, honesty with intimacy, or combinations thereof.

It is discovered that such cosmetic effects (i.e., natural appearance with added emotional dimension) can be achieved by combination of an intermittent pattern of pearlescently colored elements and a dark, non-pearlescent limbal ring surrounding the intermittent pattern, which are arranged over the iris section of a contact lens. The dark, non-pearlescent limbal ring is printed on the surface of the contact lens using a dark non-pearlescent colorant (i.e., free of any pearlescent pigment). The intermittent pattern of pearlescently colored elements is printed over the iris section of a contact lens using at least one colorant comprising at least one pearlescent pigment in an amount sufficient to provide a desired amount of pearlescence, luster, semi-opacity, or combination thereof but insufficient to impart an unnatural appearance. Pearlescence may evoke sophistication and depth, luster may suggest well-being, and semi-opacity may allude to honesty with intimacy. However, if the amount of the at least one pearlescent pigment is too high, the pearlescent pigment may provide a shining effect to an extent so as to appear unnatural to an ordinary viewer.

In one respect, the invention provides a contact lens comprising a non-opaque pupil section, an iris section surrounding the pupil section, and a non-opaque peripheral section surrounding the iris section, wherein the iris section includes an intermittent pattern of pearlescently colored elements and a dark limbal ring surrounding the intermittent pattern, wherein the intermittent pattern and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern. In a preferred embodiment, the pearlescent colorant comprises at least one pearlescent pigment in an amount sufficient to provide to the iris section of the contact lens a desired amount of pearlescence, luster, semi-opacity, or combination thereof but insufficient to impart an unnatural appearance to a wearer's eye color.

For the population of color elements within a region, percent refers to the portion of the total area within the region covered by the color elements as measured by an image analyzer known in the art such as a BAUSCH & LOMB OMNICON 5000™ calibrated against a known standard.

The pupil section is located generally at the center of the lens over the pupil and can have an uneven or substantially even border with iris section.

The iris section is not totally opaque, but rather is colored with an intermittent pattern of pearlescently-colored elements and with a limbal ring only to the extent that it will influence the perceived color of the underlying iris, but will still allow the structure and fine detail of the natural iris to been seen therethough.

The intermittent patterns must be colored with at least one pearlescent colorant. Preferably, the pearlescent colorant comprises at least one pearlescent pigment in an amount sufficient to provide to the iris section of the contact lens a desired amount of pearlescence, luster, semi-opacity, or combination thereof but insufficient to impart an unnatural appearance to a wearer's eye color.

The intermittent patterns can be comprised of zones. The zones may be comprised of shaped pearlescently pigmented areas within the zones. The shaped areas may be further comprised of dots. Examples of zones include: a single annular iris color zone with irregular inner and outer borders; multiple concentric annular zones; annular zones with outer and inner jagged borders (or starbursts); and a single iris zone but irregular in structure along multiple radial lines. Examples of shaped pigmented areas within zones include circular areas, ovular areas, irregular elongated regions in worm-like shapes, radial segments, and combinations of these shapes.

The elements of the intermittent pattern are preferably dots, and especially preferred are dots, some of which run together. Certain portions of the iris section are less densely covered with dots than other portions. The less densely covered portions form approximately radial spokes. This arrangement enhances the structure of the iris of a person wearing the lens.

It is understood that the pearlescently colored elements can be interspersed with areas uncolored by the pearlescent colorant. It is also understood that dots can have any shape, regular or irregular, such as round, square, hexagonal, elongated, etc. Furthermore, the elements of the intermittent pattern may have a shape other than dots, so long as the elements are undescrinable to the ordinary viewer.

In one embodiment of the invention, the elements of the intermittent pattern (preferably dots) are in two portions (or two zones). A first portion of the elements are of a first shade and are located generally on the inside of the iris section, i.e. at or near the inner perimeter of the substantially annular iris section. A second portion of the elements are of a second shade different from the first shade and are located generally on the outside of the iris section, i.e. at or near the outer perimeter of the substantially annular iris section and surrounding the first portion. A jagged border separates the first and second portions of the pattern elements. This border need not be precise. Some dots of the first shade may be mixed in with dots of the second shade, so long as there is a jagged border or border zone across which there takes place a noticeable change of shade.

Figure 1B:
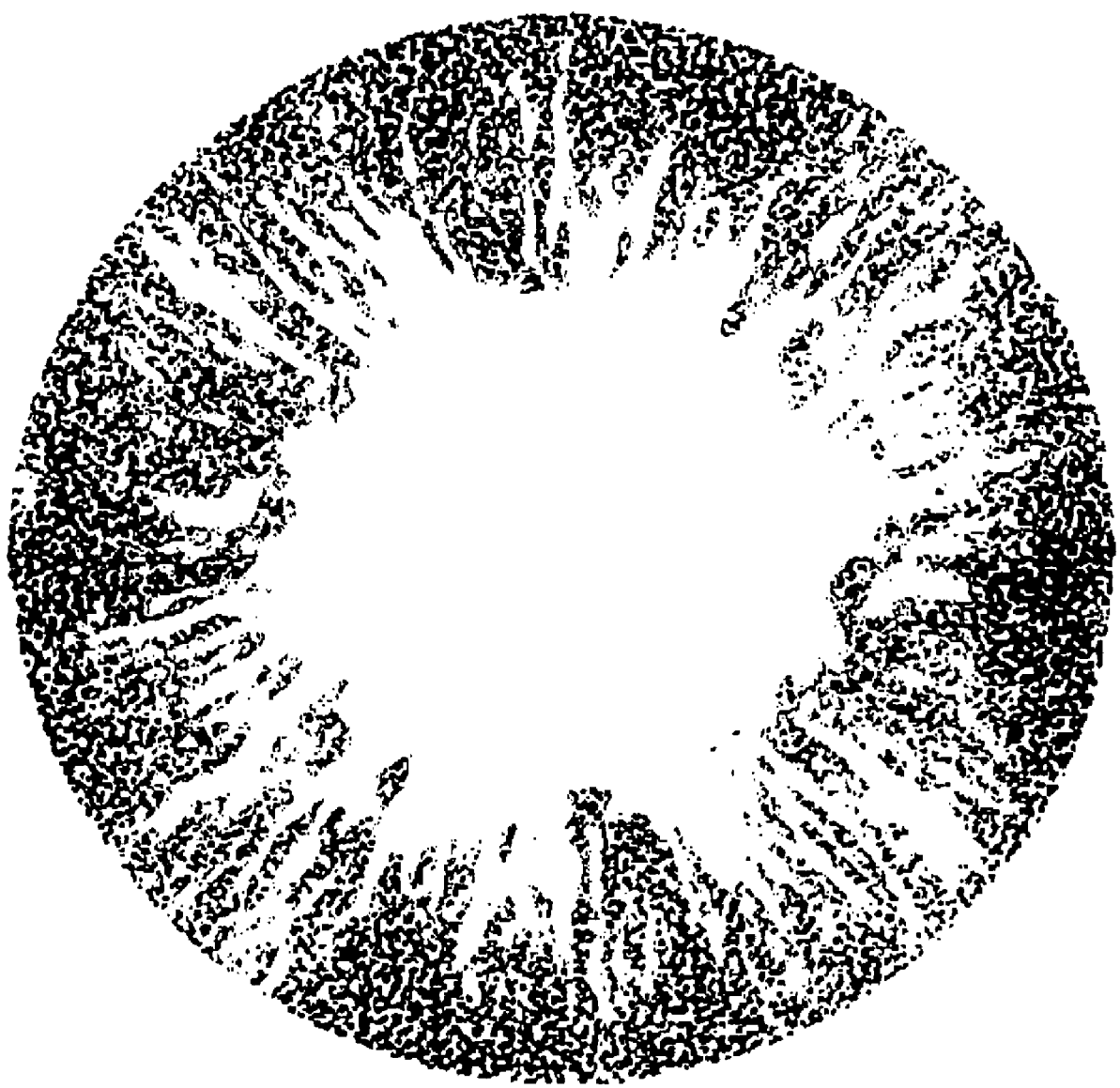

As an illustrative example, FIG. 1A and FIG. 1B (or FIG. 5) together define a preferred intermittent pattern of pearlescently colored elements arranged over the iris section of a contact lens. A first portion of the pearlescently colored elements (FIG. 1A) are of a first shade, e.g., hazel, and are located on the inside of the iris section. A second portion of the pearlescently colored elements (FIG. 1B or FIG. 5)) are of a second shade, e.g., blue, green, hazel or amethyst, and are located on the outside of the iris section. The jagged outer edge of the pattern of FIG. 1A will merge with the jagged inner edge of the pattern of FIG. 1B or FIG. 5 to form a jagged border between the two portions having different shades.

Figure 2A:
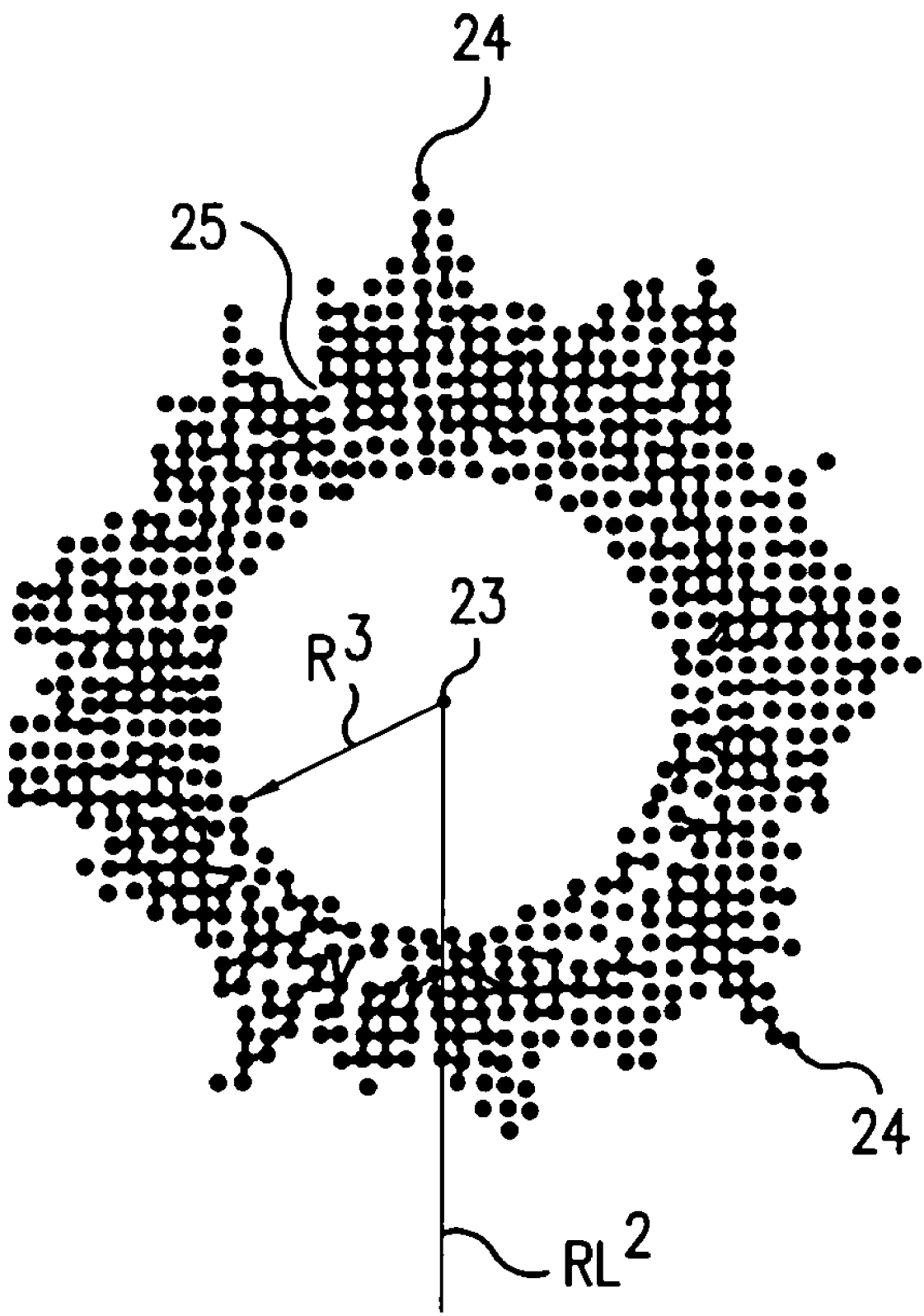
FIGS. 2A and 2B illustrate an intermittent pattern of pearlescently colored elements in accordance with a preferred embodiment of the invention: a first (inside) portion of pearlescently colored elements of a first shade (FIG. 2A) and a second (outside) portion of pearlescently colored elements of a second shade (FIG. 2B).
Figure 2B:
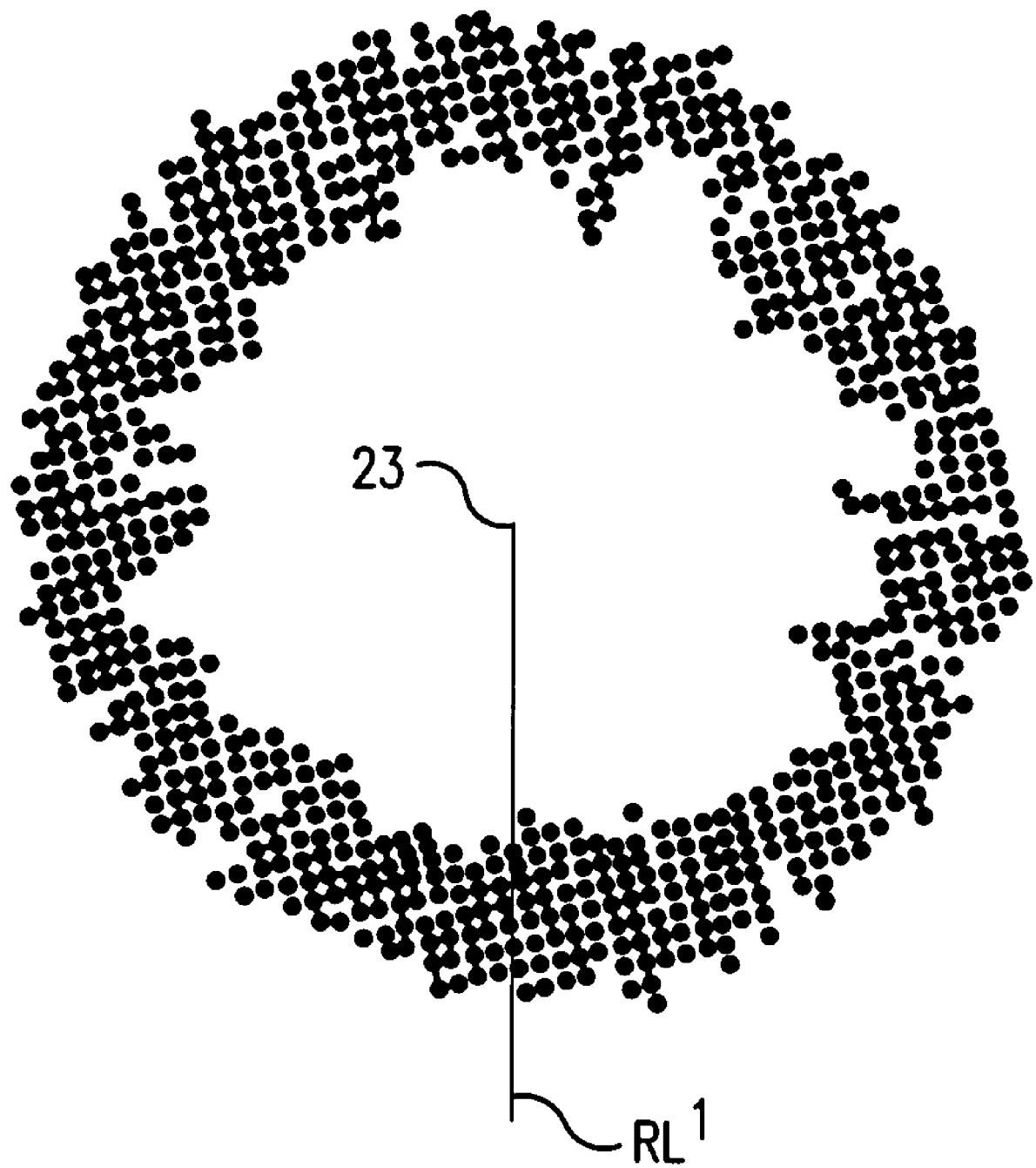

FIGS. 2A and 2B illustrate another example of an iris section comprising an intermittent pattern of pearlescently colored elements which are in two portions, a first portion of first shade (FIG. 2A) and a second portion of second shade (FIG. 2B). Centers 23 of both patterns are in alignment and in addition the patterns are rotationally aligned so that radial lines $RL^1$ and $RL^2$ coincide. The first shade is preferably hazel and the second shade is preferably a color selected from the group consisting of blue, green, hazel, and amethyst.

Figure 3A:
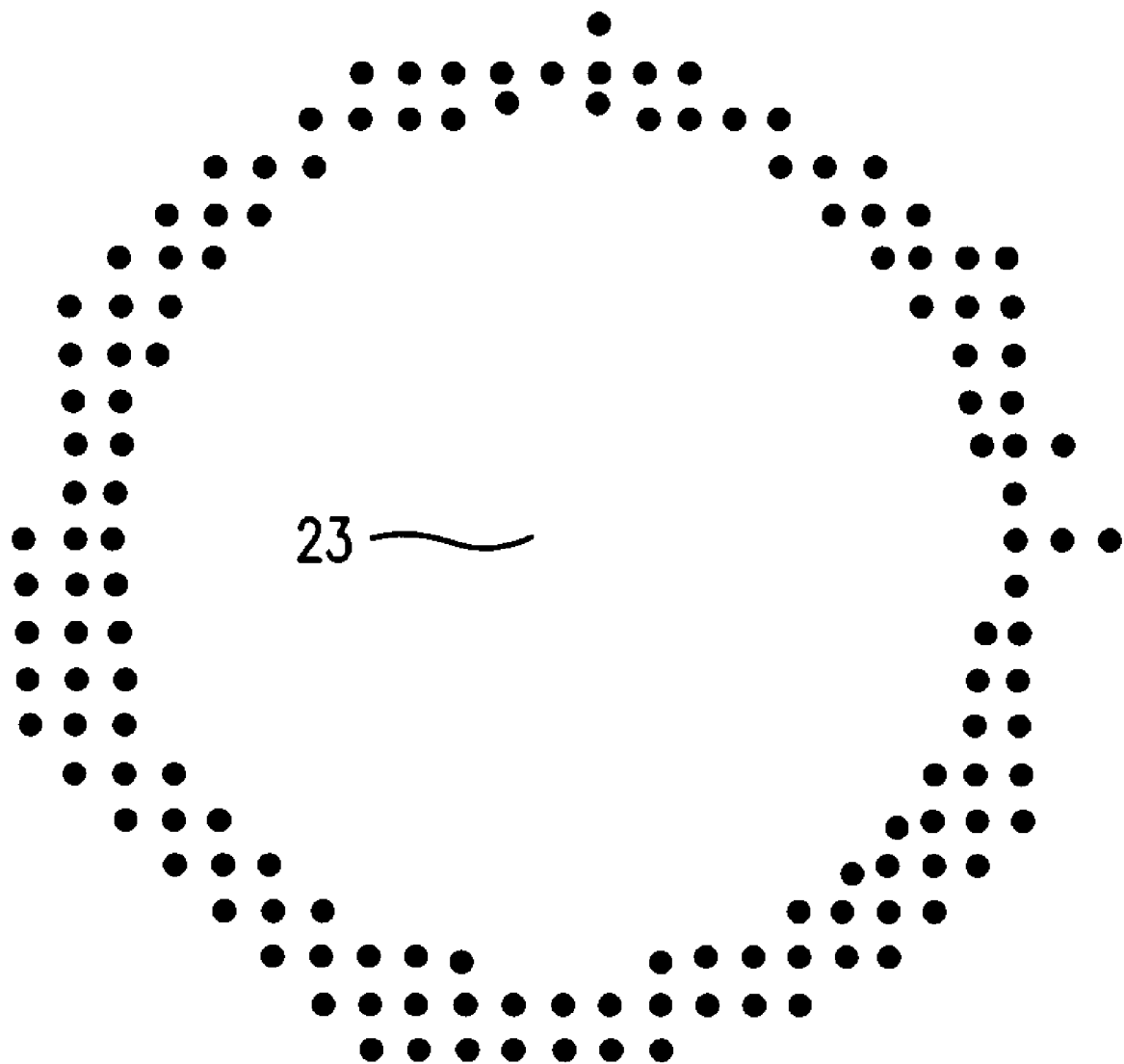
FIGS. 3A, 3B, and 3C illustrate an intermittent pattern of pearlescently colored elements in accordance with a preferred embodiment of the invention: a first portion of pearlescently colored elements of a first shade (FIG. 3A); a second portion of pearlescently colored elements of a second shade (FIG. 3B); and a third portion of pearlescently colored elements of a third shade (FIG. 3C).
Figure 3B:
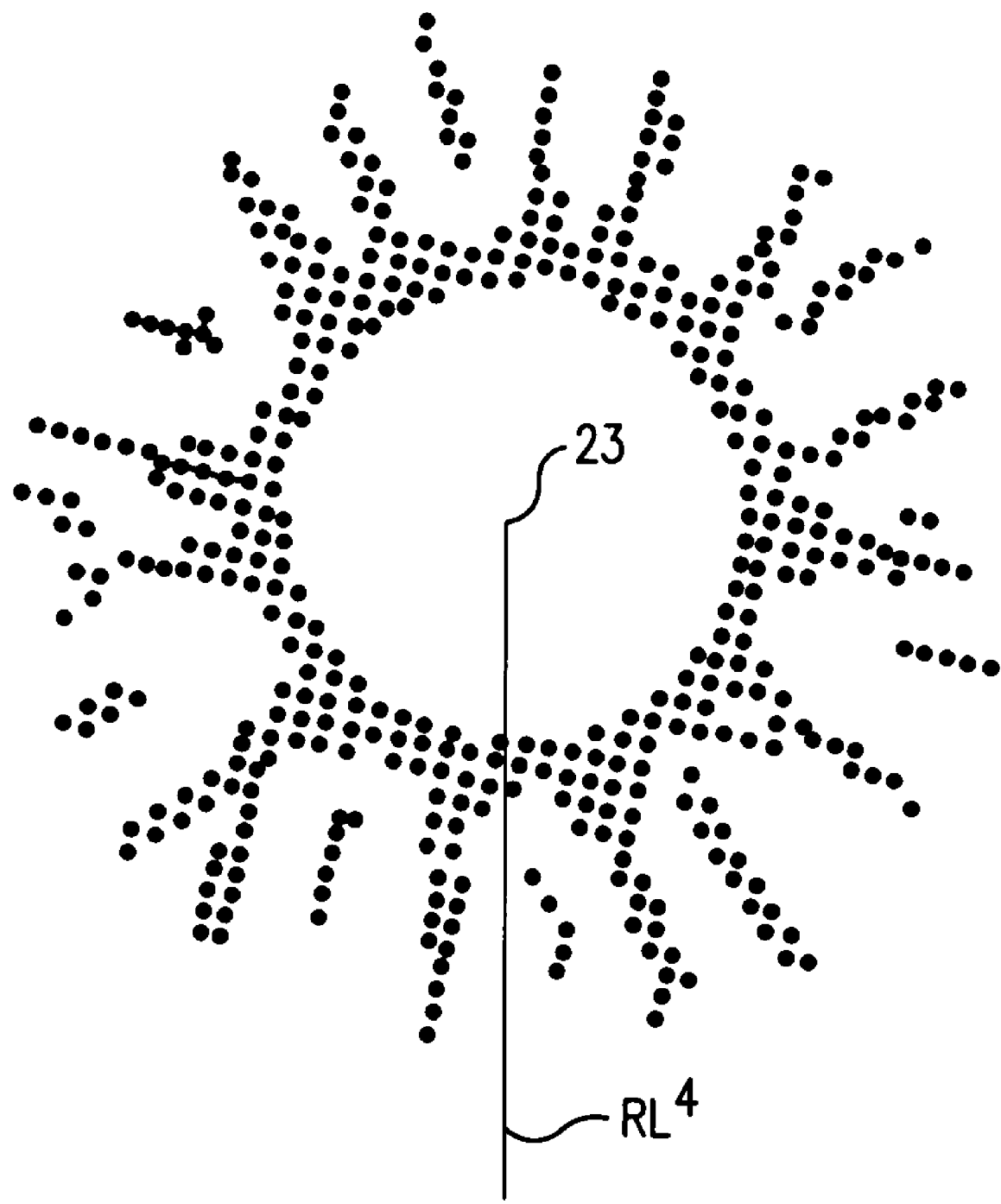
Figure 3C:
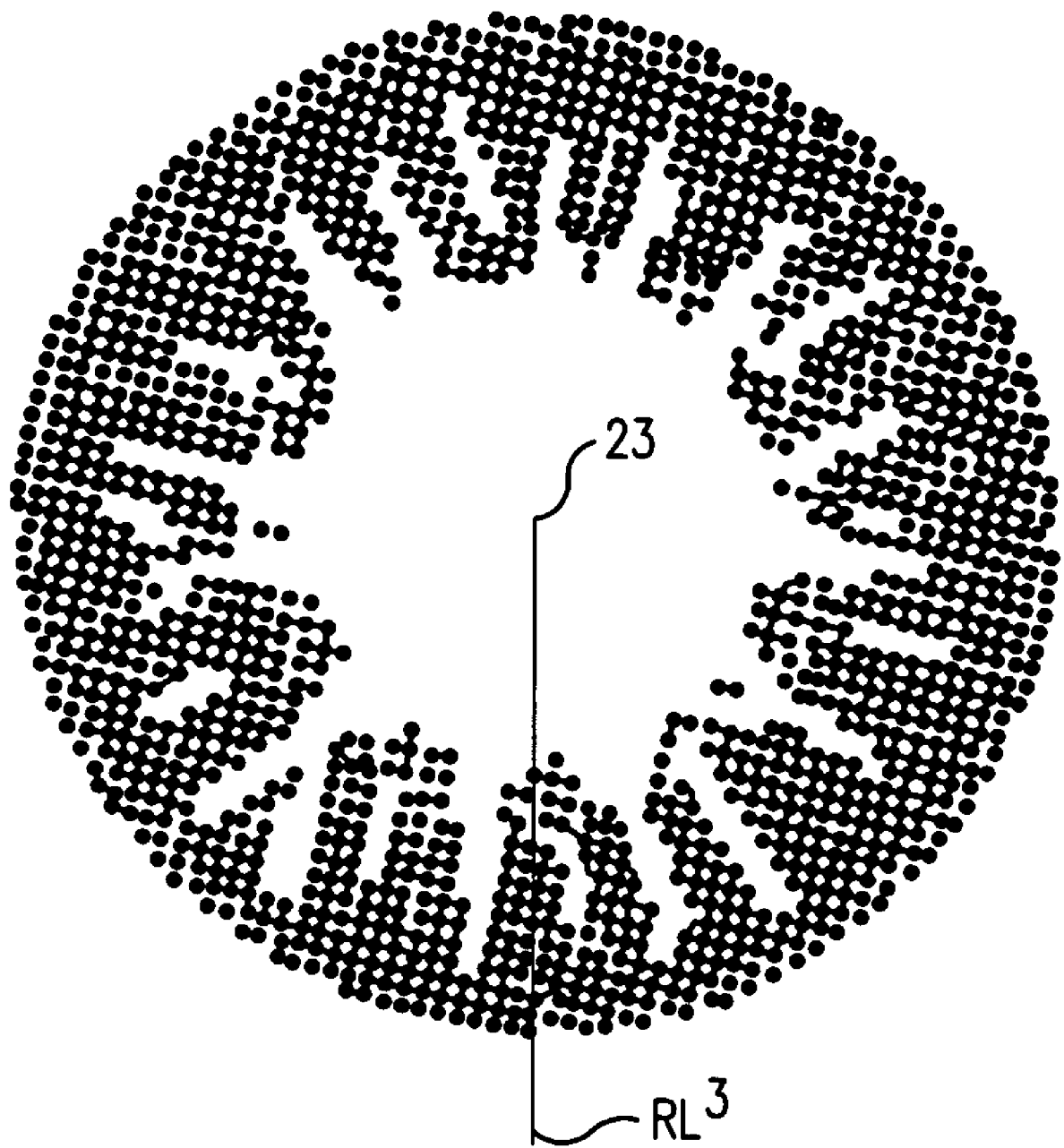

In another embodiment of the invention, the pearlescently colored elements of the intermittent pattern are in three portions, a first portion of first shade, a second portion of second shade, and a third portion of third shade, wherein the first, second and third shades are different from each other. For example, the first shade can be black; the second shade can be hazel, yellow brown, or gray; and the third shade is blue, green, hazel, or amethyst. The pattern of the first portion can be one shown in FIG. 3A, the pattern of the second portion can be one shown in FIG. 3B, and the pattern of the third portion can be one shown in FIG. 3C. Centers 23 of each pattern are aligned and patterns 3B and 3C are rotationally aligned along radial lines $RL^4$ and $RL^3$. There is a jagged border between the second portion of the second shade and the third portion of the third shade.

The limbal ring can be comprised of any shaped pigmented areas, preferably, opaque dots, which are printed on the surface of a contact lens with a dark colorant being free of any pearlescent pigment, and has a substantially even border with the non-opaque peripheral section. The limbal ring can have a substantially even circular border or preferably a jagged (or uneven or irregular) border (FIG. 4), with the intermittent pattern of pearlescently-colored elements. Optionally, the limbal ring overlaps to some degrees with the intermittent pattern of pearlescently-colored elements. Preferably, the shaped pigmented areas are interspersed with the pearlescently colored elements of the intermittent pattern so that the interplay of the dark colored elements (non-pearlescent) of the limbal ring with the pearlescently colored elements of the intermittent pattern can enhance the natural appearance of wearer's eye color.

In accordance with the present invention, the dark colorant for printing the limbal ring can be any dark color, for example, such as dark green, dark blue, dark gray, preferably black.

A preferred method for making a contact lens in accordance with this invention is through printing, such as for example, pad transferring printing and/or inkjet printing. In one such contemplated printing process, one or more pearlescent pigments are added to a conventional non-pearlescent ink formulation including polymeric binder, solvent and bonding agent (such as hexamethylene diisocyanate). See, for instance, Knapp, U.S. Pat. No. 4,582,402; Loshaek, U.S. Pat. No. 4,668,240 and the aforementioned Jahnke U.S. Pat. No. 5,414,477 as to conventional materials and printing processes.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

Typical binder polymers have crosslinkable groups. The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

The crosslinking may occur by other means. For example, an amino group and a hydroxyl group can covalently linked together by using a coupling agent (e.g., a carbodiimide) to form an amide bond. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

A binder polymer in the ink of the invention can be any polymer which is compatible with lens material. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according to any known suitable methods. For example, first a solution of binding polymer and solvent is prepared and this solution is mixed with paste containing the colorant to form an ink. It is currently preferred to form inks from binding polymer solutions having a viscosity of about 40,000 cps.

Printing the lens using the known printing process (pad transferring printing) of U.S. Pat. No. 4, 582,402 to Knapp, incorporated herein by reference, and the known printing process of U.S. Pat. Nos. 5,034,166 and 5,116,112 to Rawlings, incorporated herein by reference, is generally as follows.

A plate or cliche is prepared having flat surface and circular depressions corresponding to the desired dot pattern. Each depression should have a diameter with a range of about 0.05 to about 0.15 mm, preferably 0.10 mm, and a depth preferably in the range of about 0.010 to about 0.030 mm., and most preferably about 0.013 mm. The depressions are arranged to cover an annular shape corresponding to that of the iris section of the lens.

The plate may be made by a technique that is well known for making integrated analog or digital circuits. First a pattern about 20 times as large as the desired pattern is prepared. Next the pattern is reduced to the required size using well-known photographic techniques to a pattern of the exact desired size. A flat metal surface is covered by a photo resist material which becomes water insoluble when exposed to light. The photo resist material is covered with the pattern and exposed to light. The unnecessary portion of the photo resist pattern is removed by washing with water and the metal plate is etched at the portions not exposed to light to the required depth. Then the remainder of the photoresist material is mechanically removed after the etching process.

An ink is deposited on the flat surface of the plate and scraped across the pattern with a doctor blade. This causes depressions to be filled with the ink while removing excess ink from the flat surface. The colorant may be more or less opaque depending on the degree of color change desired. The opacity may be varied by modifying the proportion of pigment to binder in the colorant. It will be recognized that a desired effect may be obtained using a highly opaque colorant or by having a somewhat less opaque colorant and covering a greater portion of the iris section surface.

A pad made of silicon rubber, impregnated with silicon oil for easy release, is pressed against the pattern, removing ink from depressions. The ink on the pad is allowed to dry slightly as needed to improve tackiness, then pressed against the front surface of the contact lens, depositing the ink in the desired pattern over the iris section. Of course the pad must have enough flexibility to deform to fit over the convex front surface of the lens. The printing could be done in the concave surface of the lens by modifying the shape of the pad and placement of the lens. For a more natural effect, the printing step may be repeated one or more times using different patterns in different colors, since upon close examination, the irises of many persons are found to contain more than one color. The printed pattern need not be absolutely uniform, allowing for enhancement of the fine structure of the iris. A more natural appearance may be obtained by printing on both the concave and convex sides of the lens.

Next the deposited pattern is treated to render it resistant to removal from the lens under exposure to the ocular fluids that the lens will encounter when placed in the eye and when lens cleaning takes place. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

It is understood that either the anterior (convex) or posterior (concave) surfaces of the lens may be printed, but printing the anterior surface is presently preferred.

It is also understood that if a lens is constructed of a hydrophilic material (a hydrogel), the steps described above are performed with the material in an unhydrated state.

Printing the lens using an inkjet printing process is described in published US Patent Application Nos. 2001/0050753, 2001/0085934, 2003/0119943, and 2003/0184710, herein incorporated by references in their entireties.

In another aspect, the invention encompasses a method for making a colored contact lens having a pupil section, an iris section surrounding the pupil section, and a peripheral section surrounding the iris section, comprising the steps of: providing a non-opaque contact lens; and printing, in no particular order on the surface of the iris section of the contact lens, an intermittent pattern of pearlescently colored elements with at least one pearlescent colorant and a dark limbal with a dark colorant free of pearlescent pigment, wherein the intermittent pattern of pearlescently colored elements and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern.

In a preferred embodiment, the pearlescent colorant comprises at least one pearlescent pigment in an amount sufficient to provide to the iris section of the contact lens a desired amount of pearlescence, luster, semi-opacity, or combination thereof but insufficient to impart an unnatural appearance to a wearer's eye color.

In another preferred embodiment, the method of the invention comprises the steps of applying two portions of pearlescently colored elements and a dark non-pearlescent limbal ring to the surface of a transparent contact lens. The first portion of pearlescently colored elements is of a first shade, which may have a pattern similar to FIG. 2 for example. The second portion of pearlescent colorant, the iris colorant, which may have a pattern similar to FIG. 1 for example, is a second shade. The dark limbal ring, which may have a pattern similar to FIG. 8 for example, is a third shade. The first portion will be located generally on the inside of and surrounded by the second portion which will be located generally on the inside of the limbal ring. A first uneven border will differentiate the first and second portions of pearlescently colored elements, a second uneven border will differentiate the limbal ring and the second portion of pearlescently colored elements, thereby providing a lens capable of making a color change or enhancement to the iris of a person wearing the lens while imparting a vivacious appearance.

The steps used in order to deposit the colored patterns on the lens surface include using a first plate having depressions corresponding to the firs portion and filling the depressions with a first pearlescent colorant including at least one pearlescent pigment. Then, pressing a first flexible pad against the first plate and subsequently pressing the first flexible pad against the surface of the lens (either side) thereby printing the first portion of the pearlescently colored elements. The first pearlescent colorant preferably has a hazel color.

Using a second plate having depressions corresponding to the second portion, the depressions are filled in with a second pearlescent colorant including at least one pearlescent pigment. Next, the second flexible pad is pressed against a second plate, followed by pressing the second flexible pad against the surface of the lens (either the same or the opposite surface) thereby printing the second portion of the elements. The second pearlescent colorant preferably has a color selected from the group consisting of blue, green, hazel, and amethyst.

Finally, using a third plate having depressions corresponding to the limbal ring and filling the depressions with a dark colorant without any pearlescent pigment. Pressing a third flexible pad against the third plate and pressing the third flexible pad against said surface of the lens (either side) thereby prints the limbal ring. In order to achieve the effect of vivaciousness, a preferred embodiment is to print the limbal ring with a black colorant, wherein the limbal ring has an uneven border with the intermittent pattern. More preferably, the limbal ring is comprised of shaped pigmented areas interspersed with the pearlescently colored elements of the intermittent pattern.

In a preferred embodiment, a colored contact lens of the invention further comprises an interior ring arranged over the iris section near the pupil section, wherein the interior ring is comprised of a dark colorant free of pearlescent pigment, wherein the interior ring has a substantially even or uneven interior and/or exterior border and overlaps to some degrees with the intermittent pattern of pearlescently-colored elements. Preferably, the interior ring has a shade different from the shade of the limbal ring. More preferably, the interior ring and the limbal ring have the same basic color but the color intensity of the interior ring is lighter than that of the limbal ring. By having an interior ring, a colored contact lens of the invention can have minimized (or no) demarcation between the print and the natural iris, which is noticeable to an ordinary viewer.

The interior border of an interior ring is intended to describe one of its two borders that is closer to the pupil section. The exterior border of an interior ring is intended to describe one of its borders that is closer to the non-opaque peripheral section.

The interior ring can be comprised of any shaped pigmented areas, preferably, opaque dots, which are printed on the surface of a contact lens with a dark colorant being free of any pearlescent pigment. The interior ring can have an uneven or substantially even circular border (FIG. 1A or 2A), with the pupil section.

An interior ring can be printed by making, in the above described third plate having limbal ring depressions (i.e., depressions corresponding to the limbal ring), an interior-ring depressions (i.e., depressions corresponding to the interior ring), wherein the interior-ring depressions are shallower than the limbal ring depressions (e.g., at least 70% shallower, preferably at least 50% shallower, even more preferably 30% shallower than the limbal ring depressions). After filling the depressions with a dark colorant without any pearlescent pigment, pressing a third flexible pad against the third plate and pressing the third flexible pad against said surface of the lens (either side) thereby prints the limbal ring and the interior ring. Since the interior ring depressions are shallower than the limbal ring depressions, the resultant interior ring has less amount of the colorant and therefore lighter color intensity.

Although the steps listed above put an order to the printing of the portions on the lens, the order of printing may vary depending upon the intended cosmetic effect, and any other appropriate order of printing could be used in the present invention.

In accordance with a preferred embodiment, a colored contact lens may further comprise a clear coating covering at least the iris section. A clear coating can be formed on the iris section by applying a layer of a clear polymerizable solution free of any colorant onto the lens surface with color prints and then polymerizing the layer of clear polymerizable solution. A clear coat may minimize leaching of a colorant and may enhance wearer's comfort.

A colored lens of the invention can also be produced according to U.S. Pat. No. 5,116,112, namely by producing a colored film having an intermittent pattern of pearlescently colored elements and a dark limbal ring thereon on a molding surface of a mold for making a contact lens and then transfer-grafting the colored film to the contact lens made from the mold.

In a further aspect, the invention encompasses a method for making a colored contact lens, comprising the steps of: providing a mold comprising a first mold half having a first molding surface defining the anterior (i.e., convex curvature) surface of a contact lens and a second mold half having a second molding surface defining the posterior (i.e., concave curvature) surface of the contact lens, wherein the first and second mold halves are configured to receive each other such that a contact lens forming cavity is formed between the first and second molding surfaces; producing a colored film on a surface area of one of the two molding surfaces, where the iris section of the lens is formed, wherein the step of producing the colored film is performed by printing, in no particular order, an intermittent pattern of pearlescently colored elements with at least one pearlescent colorant and a dark limbal ring with a dark colorant free of pearlescent pigment on the surface area, wherein the intermittent pattern of pearlescently colored elements and the limbal ring are arranged over the surface area so as to cover from about 5% to about 90% of the iris section, wherein the limbal ring surrounds the intermittent pattern and has a substantially even circular border or an uneven border with the intermittent pattern, wherein the colored film contains a first surface exposed to the interior of the lens-forming cavity and a second surface in contact with the molding surface; dispensing a lens-forming material into the lens-forming cavity; and curing the lens-forming material within the lens-forming cavity to form the contact lens, whereby the colored film detaches from the molding surface and becomes integral with the body of the contact lens, wherein the colored film becomes part of one of the anterior and posterior surface of the colored contact lens.

The ink can also be applied to one or both of the molding surface of a mold used to manufacture a contact lens prior to the addition of the monomers that are used to make the lens. Furthermore, the first print on a mold or the last print on a lens can be a clear protective layer that encapsulated the inks.

Optionally, a transferable clear coating can be applied to a molding surface of a mold before applying the ink by pad transfer printing. A transfer clear coating is intended to describe a coating which can be detached from a molding surface of a mold and become integral with the body of a contact lens molded in the mold. A transferable clear coating can be applied to a molding surface of mold by any suitable techniques, such as, for example, spraying, printing, swabbing, or dipping. A transferable clear coating can be prepared from a solution comprising polymerizable components and free of any colorants. For example, a transferable clear coating with substantially uniform thickness (less than 200 microns) can be prepared by spraying a molding surface with a solution having the composition (without colorant) of an ink to be used or a solution of prepolymer or a lens-forming material to be used. This transferable clear coating can optionally be dried or cured to form a transferable clear film (without any pigment but optionally with dyes including reactive dyes). One or more colored patterns can then be printed on this transferable clear coating or film. By applying a transferable clear coating before printing, one can make a colored lens in which printed colored patterns are imbedded just below a film derived from the transferable clear coating. Such lens may be more comfortable for wearing and have much less susceptibility to colorant leaching out of the colored lens.

Any known suitable lenses made of any lens-forming material can be used to practice this invention. Preferably, hydrogel lenses or silicone-containing hydrogel lenses are used to practice this invention. Examples of preferred lenses include: without limitation, lenses described in Loshaek's U.S. Pat. No. 4,668,240 (incorporated herein by reference in its entirety); lenses prepared from a water-soluble crosslinkable poly(vinyl alcohol) prepolymer as described in U.S. Pat. Nos. 5,583,163 and 6,303,687 (incorporated by reference in their entireties); lenses made from a water-soluble crosslinkable polyurea prepolymer as described in U.S. Pat. No. 6,479,587 (herein incorporated by reference in its entirety) and a co-pending U.S. patent application Ser. No. 60/525,100 filed Nov. 25, 2003 entitled "Crosslinkable polyurea prepolymers" (herein incorporated by reference in its entirety); and the like. It is understood that any commercial available lenses, such as, for example, FOCUS DAILIES®, ACUVUE®, etc., can be used to practice this invention.

The color and pattern of the iris can be changed if a lens is coated with a minimum of 25% by area. An enhancing effect can be obtained with a minimum of approximately 5% by area.

In a still further aspect, the present invention provides a kit for making a colored contact lens. The kit of the invention comprises: (a) at least one pearlescent ink for printing of an intermittent pattern of pearlescently-colored elements onto the iris section of a non-opaque contact lens, wherein the pearlescent ink includes at least one pearlescent pigment in an amount sufficient to provide to the iris section of the contact lens a desired amount of pearlescence, luster, semi-opacity, or combination thereof but insufficient to impart an unnatural appearance to a wearer's eye color; (b) a non-pearlescent dark ink for printing a limbal ring onto the iris section of the non-opaque contact lens, wherein the dark ink is free of any pearlescent pigment, wherein the limbal ring surrounds the intermittent pattern and has a substantially even circular border or an uneven border with the intermittent pattern, wherein the combination of the intermittent pattern and the limbal ring is capable of modifying and/or enhancing a wearer's eye color when the colored contact lens is worn by the wearer.

For blue color, the pearlescent ink includes at least one pearlescent pigment and at least one conventional pigment, wherein ratio of weight percentages of the pearlescent pigment to the conventional pigment is preferably from about 1.0 to about 14, more preferably from about 1.5 to about 4. More preferably, the blue pearlescent ink includes a MagnaPearl pearlescent pigment, copper phthalocyanine blue (PCN blue) and titanium dioxide.

For green color, the pearlescent ink includes at least one pearlescent pigment and at least one conventional pigment, wherein ratio of weight percentages of the pearlescent pigment to the conventional pigment is preferably from about 1.5 to about 6, more preferably from about 1.5 to about 3.5. More preferably, the green pearlescent ink includes a Hi Lite Green pearlescent pigment, copper phthalocyanine blue (PCN blue) and $Cr_2O_3$.

For hazel color, the pearlescent ink includes at least one pearlescent pigment and at least one conventional pigment, wherein ratio of weight percentages of the pearlescent pigment to the conventional pigment is preferably from about 0.3 to about 3.5, more preferably from about 0.35 to about 1.0. More preferably, the hazel pearlescent ink includes a Hi Lite Gold pearlescent pigment, iron oxide black, iron oxide brown and titanium dioxide.

In a preferred embodiment, a kit of the invention comprises a first pearlescent ink for printing a first portion of the pearlescently colored elements of a first shade which are located at or near the inner perimeter of the iris section, and a second pearlescent ink for printing a second portion of the elements of a second shade different from the first shade which are located at or near the outer perimeter of the iris section and surrounding the first portion, wherein a jagged border separates the first and second portions of the pearlescently colored elements, wherein the first pearlescent ink has a color of hazel and the second pearlescent ink has a color selected from the group consisting of blue, green, hazel and amethyst. The first pearlescent ink includes at least one pearlescent pigment and at least one conventional pigment, wherein ratio of weight percentages of the pearlescent pigment to the conventional pigment is preferably from about 0.25 to about 2.0, more preferably from about 0.4 to about 1.5.

The ink of the invention can optionally include a crosslinker, a humectant, a surfactant, a monomer, a polymerization initiator, an antimicrobial agent, an antioxidant agent, an anti-kogating agent, and other additives known in the art.

A "crosslinker" refers to a compound comprising two or more functional groups as they are known in the art. A crosslinker molecule can be used to crosslink two or more monomers or polymer molecules. Any known suitable crosslinkers can be used in the invention. Exemplary preferred crosslinkers include, without limitation, hexamethyl diisocyanate (HMDI), ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, and 1,4-butanediol diacrylate (BDDA).

A solvent can be water or any appropriate organic or inorganic solvent. Any known suitable solvents can be used, so long as they can dissolve the binder in the ink of the invention and aid in the stability of the colorant. Examples of preferred solvents include water, water mixed with one or more co-solvent, alcohols, glycols, ketones, esters, methyl ethyl ketone, cyclopentanone, and cyclohexanone.

A "humectant" refers to a compound that removes water (or humidity) from ink such as that term is known in the art. Examples of humectant include glycerol, ethylene glycol, diethylene glycol, and 1,3-dioxane-5,5-dimethanol. By adding one or more humectants (e.g., glycerol and diethylene glycol), clogging of the nozzles of a printer head can be minimized.

The term "surfactant", as used herein, refers to a surface-active compound as that term is known in the art, such as, for example, Surfynol 420 and Surfynol 104 (from Air Products), Pluronic F108 and F38 (from BASF). A surfactant can have one ore more of the following functions: to adjust the surface tension of an ink, to defoam, to improve the separation of pigment particles, and to prevent settling or clumping of pigment particles.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

Ingredients listed in the grind formula (except the binder solution) of Table I are added to a ball mill jar along with ceramic balls. The filled ball mill jar is rotated for about 72 hours. After this time, the ball mill jar is opened and the binder solution is added. The ball mill jar is then rotated for about four hours. The pearlescent pigments are then added to an aliquot of the ball-milled grind formula and stirred gently to incorporate them. The activation solution is then added and the final ink formula is stirred to incorporate it.

TABLE I

Ink Formulations

| | Printing Ink Colors | | | | | |
|---|---|---|---|---|---|---|
| | Blue | Green | ISB Hazel | Hazel | Amethyst | Black |
| Grind Formula | | | | | | |
| Ethyl lactate | 13.725 | 19.129 | 14.905 | 18.299 | 18.763 | 19.580 |
| Binder | 46.358 | 38.844 | 39.129 | 39.039 | 36.501 | 48.869 |
| PCN Blue | 0.915 | | 0.043 | | | |
| PCN Green | | 0.549 | | | | |
| I.O. Yellow | | 1.476 | 5.355 | 3.660 | 4.477 | |
| Titanium Dioxide | | | 0.445 | | | |
| I.O. Red | | | 1.128 | | | |
| I.O. Black | | | | | 1.013 | 9.782 |
| Carbazole Violet | | | | | 0.244 | |
| Pearlescent pigments | | | | | | |
| Magna Pearl | 12.200 | 6.100 | | 6.100 | 12.200 | |
| Hi Lite Gold | | | 12.197 | 6.100 | | |
| Hi Lite Green | | 6.100 | | | | |
| Activation Solution | | | | | | |
| HEMA | 20.276 | 20.276 | 20.272 | 20.276 | 20.276 | 16.461 |
| EOEMA | 2.269 | 2.269 | 2.269 | 2.269 | 2.269 | 1.845 |
| Vazo 64 | 0.110 | 0.110 | 0.110 | 0.110 | 0.110 | 0.098 |
| HDI | 4.148 | 4.148 | 4.147 | 4.148 | 4.148 | 3.364 |

Binder is prepared by polymerizing of a composition comprising of 38.33% HEMA, 4.20% EOEMA (2-ethoxyethyl methacrylate), 0.32% ME (2-mercapto ethanol), 0.21% AIBN (azobis(isobutyronitrile), and 56.93% cyclopentanone, according to a procedure similar to that described in U.S. Pat. No. 4,668,240 (herein incorporated by reference in its entirety) (polymerization reaction can be stopped by adding monoethylhydroquinone);
I.O = Iron Oxide;
Pearlescent pigments are from Engelhard;
HEMA = 2-hydroxyethyl mathacrylate;
EOEMA = ethoxyethyl methacrylate;
Vazo 64 = pentanenitrile, 2,4-dimethyl, 2,2' azobis (DuPont);
HDI = 1,6-hexamethylene diisocyante

EXAMPLE 2

Ingredients listed in the grind formula (except the binder solution) of Table II are added to a ball mill along with ceramic balls. The filled ball mill jar is rotated for about 72 hours. After this time, the ball mill jar is opened and the binder solution is added. The ball mill jar is then rotated for about four hours. The pearlescent pigments are then added to an aliquot of the ball-milled grind formula and stirred gently to incorporate them. The activation solution is then added and the final ink formula is stirred to incorporate it.

TABLE II

Ink Formulations

| | Printing Ink Colors | | | | | |
|---|---|---|---|---|---|---|
| | Blue | Green | ISB Hazel | Hazel | Amethyst | Black |
| Grind Formula | | | | | | |
| Ethyl lactate | 13.725 | 19.129 | 14.905 | 18.299 | 18.763 | 19.580 |
| Binder | 46.358 | 38.844 | 39.129 | 39.039 | 36.501 | 48.869 |
| PCN Blue | 0.915 | | 0.043 | | | |

TABLE II-continued

Ink Formulations

Printing Ink Colors

| | Blue | Green | ISB Hazel | Hazel | Amethyst | Black |
|---|---|---|---|---|---|---|
| PCN Green | | 0.549 | | | | |
| I.O. Yellow | | 1.476 | 5.355 | 3.660 | 4.477 | |
| Titanium Dioxide | | | 0.445 | | | |
| I.O. Red | | | | 1.128 | | |
| I.O. Black | | | | | 1.013 | 9.782 |
| Carbazole Violet | | | | | 0.244 | |
| Pearlescent pigments | | | | | | |
| Magna Pearl | 12.200 | 6.100 | | 6.100 | 12.200 | |
| Hi Lite Gold | | | 12.197 | 6.100 | | |
| Hi Lite Green | | 6.100 | | | | |
| Activation solution | | | | | | |
| HEMA | 20.276 | 20.276 | 20.272 | 20.276 | 20.276 | 16.461 |
| EOEMA | 2.269 | 2.269 | 2.269 | 2.269 | 2.269 | 1.845 |
| Vazo 64 | 0.110 | 0.110 | 0.110 | 0.110 | 0.110 | 0.098 |
| HDI | 4.148 | 4.148 | 4.147 | 4.148 | 4.148 | 3.364 |

Binder is prepared as described in Example 1;
I.O = Iron Oxide;
Pearlescent pigments are from Engelhard;
HEMA = 2-hydroxyethyl mathacrylate;
EOEMA = ethoxyethyl methacrylate;
Vazo 64 = pentanenitrile, 2,4-dimethyl, 2,2' azobis (DuPont);
HDI = 1,6-hexamethylene diisocyante

EXAMPLE 3

An ink of Example 1 is filled into the depression of a cliche having the pattern of FIG. 1A, FIG. 1B, FIG. 4, or FIG. 5, the top surface of the cliche is swept ("doctored") with a flat blade, and the ink left in the depression is transferred onto a silicone printing pad. The silicone pad is then applied to the anterior (convex) surface of a cast molded unhydrated hydrophilic lens (e.g., a hydrophilic lens made of hydroxyethyl methacrylate, ethoxy ethyl methacrylate, and methacrylic acid as shown in U.S. Pat. No. 4,668,240, herein incorporated by reference in its entirety). The lens to which the ink is applied is situated on the male half of the mold, wherein the female half of the mold is removed to expose the convex surface of the lens.

An inner starburst (ISB) pattern (FIG. 1A) is applied nearest to and surrounding the transparent pupil section by using the ISB Hazel ink (Table I). After the ISB ink has cured (e.g., thermal curing for 45 minutes at 85° Celsius), an iris pattern (FIG. 1B or FIG. 5) is applied outside the ISB pattern and closer to the periphery of the lens, using an ink selected from the group consisting of blue, green hazel, and amethyst inks shown in Table I. Finally, after the iris ink has cured, a limbal ring (FIG. 4) and an interior ring (FIG. 1A) are simultaneously printed outside and inside the iris pattern using the black ink (Table I) and a cliche comprising limbal ring depressions and interior ring depressions, wherein the limbal ring depressions are deeper than the interior ring depressions.

After printing stage, the lens is removed from the mold and hydrated, using hydration solution comprised primarily of purified water. The lens is transferred into a packaging solution comprised primarily of purified water and a borate buffer.

EXAMPLE 4

Figure 4:
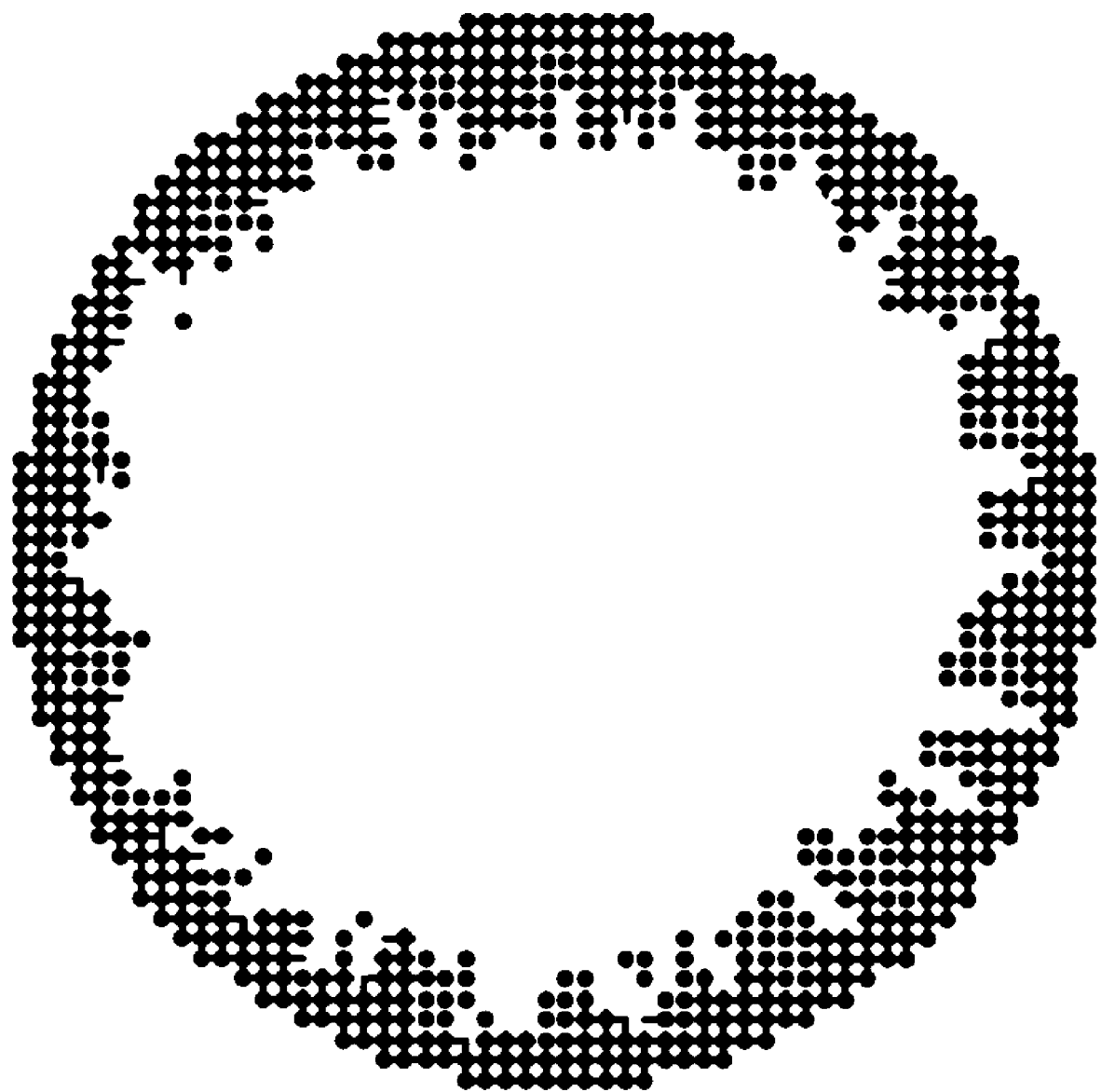
FIG. 4 illustrates a dark limbal ring of non-pearlescently colored elements in accordance with a preferred embodiment of the invention.
Figure 5:
FIG. 5 illustrates a portion of pearlescently colored elements according to a preferred embodiment of the invention.

A colored contact lens is prepared by printing the patterns shown in FIG. 1A, FIG. 1B (or FIG. 5) and FIG. 4 according to a procedure described in Example 3. The pattern of FIG. 1A is printed on the contact lens using the ISB Hazel ink (Table II), the pattern of FIG. 1B or FIG. 5 is printed on the contact lens using the green, blue, hazel or amethyst ink (Table II), the patterns of the limbal ring FIG. 4 and the interior ring (FIG. 1A) are printed on the contact lens using the black ink (Table I).

EXAMPLE 5

Ink pastes are prepared by grinding a composition having ingredients listed in Table III. The target viscosity of the polymer solutions are from about 30,000 CPS to about 100,000 CPS. Inks for printing a colored contact lens are prepared from the prepared ink pastes by adding a pearlescent pigment and activation solution (a mixture of HEMA, EOEMA, Vazo 64, and HDI) therein. The composition of each ink is listed in Table IV.

TABLE III

Formulations of Ink Pastes (wt. %)

| | Green | Blue I | Blue II | Hazel I | Hazel II | Black |
|---|---|---|---|---|---|---|
| Ethyl lactate | 28.53 | 30.55 | 31.14 | 30.00 | 30.00 | 23.98 |
| Binder | 63.85 | 61.15 | 62.77 | 50.00 | 55.10 | 64.04 |
| PCN Blue | 0.03 | 1.21 | 0.29 | | | |
| $Cr_2O_3$ | 7.59 | | | | | |
| Titanium Dioxide | | 7.09 | 5.80 | 3.93 | | |
| I.O. Red | | | | | 3.45 | |
| I.O. Black | | | | 4.27 | 5.70 | 11.98 |
| I.O. Brown | | | | 11.8 | 5.75 | |

Binder is prepared as described in Example 1;
I.O = Iron Oxide.

TABLE IV

Formulations of Inks (wt. %)

| | Green | Blue | Gray | Hazel | ISB Hazel | Black |
|---|---|---|---|---|---|---|
| Pearlescent pigments | | | | | | |
| Magna Pearl | | 10.30 | 10.30 | | | |
| Hi Lite Gold | | | | 10.30 | 10.30 | |
| Hi Lite Green | 10.30 | | | | | |
| Ink Paste | | | | | | |
| Green | 68.63 | | | | | |
| Blue I | | 68.63 | | | | |
| Blue II | | | 68.63 | | | |
| Hazel I | | | | 68.63 | | |
| Hazel II | | | | | 68.63 | |
| Black | | | | | | 78.93 |
| Activation Solution | 21.07 | 21.07 | 21.07 | 21.07 | 21.07 | 21.07 |

Pearlescent pigments are from Engelhard;

A colored contact lens is prepared by printing the patterns shown in FIG. 1A, FIG. 1B (or FIG. 5) and FIG. 4 according to a procedure described in Example 3. The pattern of FIG. 1A is printed on the contact lens using the ISB Hazel ink (Table IV), the pattern of FIG. 1B or FIG. 5 is printed on the contact lens using the green, blue, gray, or hazel ink (Table IV), the patterns of the limbal ring FIG. 4 and the interior ring (FIG. 1A) are printed on the contact lens using the black ink (Table IV).

What is claimed is:

1. A colored contact lens comprising:
a non-opaque pupil section;
an iris section surrounding the pupil section; and
a non-opaque peripheral section surrounding the iris section,
wherein the iris section includes an intermittent pattern of pearlescently colored elements and a dark limbal ring surrounding the intermittent pattern, wherein the intermittent pattern and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern.

2. The colored contact lens of claim 1, wherein the pearlescent colorant comprises at least one pearlescent pigment in an amount sufficient to provide to the iris section of the contact lens a desired amount of pearlescence, luster, semi-opacity, or combination thereof but insufficient to impart an unnatural appearance to a wearer's eye color.

3. The colored contact lens of claim 2, wherein the intermittent pattern comprises a first portion of the pearlescently colored elements of first shade and a second portion of the pearlescently colored elements of the second shade different from the first shade, wherein the first portion of the pearlescently colored elements are located at or near the inner perimeter of the iris section, wherein the second portion of the pearlescently colored elements are located at or near the outer perimeter of the iris section and surrounding the first portion.

4. The colored contact lens of claim 3, wherein a jagged border or border zone separates the first and second portions of the pattern elements, wherein there takes place a noticeable change of shade across the jagged border or border zone.

5. The colored contact lens of claim 4, wherein the first shade is hazel, wherein the second is green, blue, gray, hazel, or amethyst.

6. The colored contact lens of claim 2, wherein the intermittent pattern include a first portion of the pearlescently colored elements of first shade, a second portion of the pearlescently colored elements of second shade, and a third portion of the pearlescently colored elements of third shade, a third portion of third shade, wherein the first, second and third shades are different from each other.

7. The colored contact lens of claim 2, wherein the limbal ring has an uneven border with the intermittent pattern of the pearlescently-colored elements.

8. The colored contact lens of claim 7, wherein the limbal ring is comprised of shaped pigmented areas which are printed with a non-pearlescent colorant of a color of black.

9. The colored contact lens of claim 2, further comprising an interior ring arranged over the iris section near the pupil section, wherein the interior ring is comprised of a dark colorant free of pearlescent pigment, wherein the interior ring has a substantially even or uneven interior and/or exterior border and overlaps to some degrees with the intermittent pattern of pearlescently-colored elements, wherein the interior ring has a shade different from the shade of the limbal ring.

10. The colored contact lens of claim 9, wherein the interior ring and the limbal ring have an identical basic color but the color intensity of the interior ring is lighter than that of the limbal ring.

11. The colored contact lens of claim 2, further comprising a clear coating which covers at least the iris section.

12. A method for making a colored contact lens having a pupil section, an iris section surrounding the pupil section, and a peripheral section surrounding the iris section, comprising the steps of: providing a non-opaque contact lens; and printing, in no particular order on the surface of the iris section of the contact lens, an intermittent pattern of pearlescently colored elements with at least one pearlescent colorant and a dark limbal with a dark colorant free of pearlescent pigment, wherein the intermittent pattern of pearlescently colored elements and the limbal ring are arranged over the iris section so as to cover from about 5% to about 90% of the iris section, wherein the limbal ring is comprised of a dark colorant free of pearlescent pigment, wherein the limbal ring has a substantially even border with the non-opaque peripheral section and a substantially even circular border or an uneven border with the intermittent pattern.

13. The method of claim 12, wherein the printing step is carried out according to a pad-transfer printing process.

14. The method of claim 13, wherein the pad transfer printing process comprises: a) providing a plurality of plates, each plate having depressions corresponding to a unique colored pattern; b) filling the depressions of each plate with a colorant, one of said plates being filled with a non-pearlescent dark colorant, each of the remaining plates being filled with one pearlescent colorant containing at least one pearlescent pigment in an amount sufficient to provide to the iris section of the contact lens a desired amount of pearlescence, luster, semi-opacity, or combination thereof but insufficient to impart an unnatural appearance to a wearer's eye color; c) pressing a plurality of flexible pads against the plates, wherein a different flexible pad is pressed against each plate; d) pressing each of the flexible pads against the surface of the lens; whereby the colored patterns are printed onto the lens.

15. The method of claim 14, wherein the intermittent pattern comprises a first portion of the pearlescently colored elements of first shade and a second portion of the pearlescently colored elements of the second shade different from the first shade, wherein the number of the plates is at least three, a first plate having depression corresponding to the limbal ring and being filled with the non-pearlescent dark colorant, a second plate having depression corresponding to the first portion and being filled with a first pearlescent colorant, and a third plate having depression corresponding to the second portion and being filled with a second pearlescent colorant.

16. The method of claim 15, wherein a jagged border or border zone separates the first and second portions of the pattern elements, wherein there takes place a noticeable change of shade across the jagged border or border zone.

17. The method of claim 16, wherein the first shade is hazel, wherein the second is green, blue, gray, hazel, or amethyst, and wherein the second shade is hazel.

18. The method of claim 15, wherein the first plate further comprises depressions corresponding to an interior ring, wherein the interior ring is arranged over the iris section near the pupil section, overlaps to some degrees with the intermittent pattern of pearlescently-colored elements, and has a substantially even or uneven interior and/or exterior border and, wherein the interior-ring-corresponding depressions are shallower than the limbal-ring-corresponding depressions.

19. The method of claim 12, further comprising a step of applying a clear coating covering at least the iris section.

20. A method for making a colored contact lens, comprising the steps of: providing a mold comprising a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces; producing a colored film on a surface area of one of the two molding surfaces, where the iris section of the lens is formed, wherein the step of producing the colored film is performed by printing, in no particular order, an intermittent pattern of pearlescently colored elements with at least one pearlescent colorant and a dark limbal ring with a dark colorant free of pearlescent pigment on the surface area, wherein the intermittent pattern of pearlescently colored elements and the limbal ring are arranged over the surface area so as to cover from about 5% to about 90% of the iris section, wherein the limbal ring surrounds the intermittent pattern and has a substantially even circular border or an uneven border with the intermittent pattern, wherein the colored film contains a first surface exposed to the interior of the lens-forming cavity and a second surface in contact with the molding surface; dispensing a lens-forming material into the lens-forming cavity; and curing the lens-forming material within the lens-forming cavity to form the contact lens, whereby the colored film detaches from the molding surface and becomes integral with the body of the contact lens.

21. The method of claim 20, wherein the printing step is carried out according to a pad-transfer printing process.

22. The method of claim 21, wherein the pad transfer printing process comprises: a) providing a plurality of plates, each plate having depressions corresponding to a unique colored pattern; b) filling the depressions of each plate with a colorant, one of said plates being filled with a non-pearlescent dark colorant, each of the remaining plates being filled with one pearlescent colorant containing at least one pearlescent pigment in an amount sufficient to provide to the iris section of the contact lens a desired amount of pearlescence, luster, semi-opacity, or combination thereof but insufficient to impart an unnatural appearance to a wearer's eye color; c) pressing a plurality of flexible pads against the plates, wherein a different flexible pad is pressed against each plate; d) pressing each of the flexible pads against the surface of the lens; whereby the colored patterns are printed onto the lens.

23. The method of claim 22, wherein the intermittent pattern comprises a first portion of the pearlescently colored elements of first shade and a second portion of the pearlescently colored elements of the second shade different from the first shade, wherein the number of the plates is at least three, a first plate having depression corresponding to the limbal ring and being filled with the non-pearlescent dark colorant, a second plate having depression corresponding to the first portion and being filled with a first pearlescent colorant, and a third plate having depression corresponding to the second portion and being filled with a second pearlescent colorant.

24. The method of claim 23, wherein a jagged border or border zone separates the first and second portions of the pattern elements, wherein there takes place a noticeable change of shade across the jagged border or border zone.

25. The method of claim 24, wherein the first shade is hazel, wherein the second is green, blue, gray, hazel, or amethyst, and wherein the second shade is hazel.

26. The method of claim 23, wherein the first plate further comprises depressions corresponding to an interior ring, wherein the interior ring is arranged over the iris section near the pupil section, overlaps to some degrees with the intermittent pattern of pearlescently-colored elements, and has a substantially even or uneven interior and/or exterior border and, wherein the interior-ring-corresponding depressions are shallower than the limbal-ring-corresponding depressions.

27. A kit for making a colored contact lens, comprising:
(a) one or more pearlescent inks for printing of an intermittent pattern of pearlescently-colored elements onto the iris section of a non-opaque contact lens, wherein each pearlescent ink includes at least one pearlescent pigment in an amount sufficient to provide to the iris section of a non-opaque contact lens a desired amount of pearlescence, luster, semi-opacity, or combination thereof but insufficient to impart an unnatural appearance to a wearer's eye color; and
(b) a non-pearlescent dark ink for printing a limbal ring onto the iris section of the non-opaque contact lens, wherein the dark ink is free of any pearlescent pigment, wherein the limbal ring surrounds the intermittent pattern and has a substantially even circular border or an uneven border with the intermittent pattern, wherein the combination of the intermittent pattern and the limbal ring is capable of modifying and/or enhancing a wearer's eye color when the colored contact lens is worn by the wearer.

28. The kit of claim 27, wherein the kit comprises a first pearlescent ink having a color of hazel and a second pearlescent ink having a color of green, blue, gray, hazel or amethyst, wherein the first pearlescent ink is used to print a first portion of the pearlescently colored elements which are located at or near the inner perimeter of the iris section, wherein the second pearlescent ink is used print a second portion of the pearlescently colored elements which are located at or near the outer perimeter of the iris section and surrounding the first portion.

29. The kit of claim 28, wherein the second pearlescent ink has a blue color and includes at least one pearlescent pigment and at least one conventional pigment, wherein ratio of weight percentages of the pearlescent pigment to the conventional pigment is from about 1.0 to about 14.

30. The kit of claim 29, wherein the second pearlescent ink includes a MagnaPearl pearlescent pigment, copper phthalocyanine blue (PCN blue) and titanium dioxide, wherein the ratio of weight percentages is from about 1.5 to about 4.

31. The kit of claim 28, wherein the second pearlescent ink has a green color and includes at least one pearlescent pigment and at least one conventional pigment, wherein ratio of weight percentages of the pearlescent pigment to the conventional pigment is from about 1.5 to about 6.

32. The kit of claim 31, wherein the second pearlescent ink includes a Hi Lite Green pearlescent pigment, copper phthalocyanine blue (PCN blue) and $Cr_2O_3$, wherein the ratio of weight percentages is from about 1.5 to about 3.5.

33. The kit of claim 28, wherein the second pearlescent ink has a hazel color and includes at least one pearlescent pigment and at least one conventional pigment, wherein ratio of weight percentages of the pearlescent pigment to the conventional pigment is from about 0.3 to about 3.5.

34. The kit of claim 33, wherein second pearlescent ink includes a Hi Lite Gold pearlescent pigment, iron oxide black, iron oxide brown and titanium dioxide, wherein the ratio of weight percentages is from about 0.35 to about 1.0.

35. The kit of claim 28, wherein the first pearlescent ink has a hazel color and includes at least one pearlescent pigment and at least one conventional pigment, wherein ratio of weight percentages of the pearlescent pigment to the conventional pigment is preferably from about 0.25 to about 2.0.

36. The kit of claim 35, wherein the ratio of weight percentages of the pearlescent pigment to the conventional pigment is from about 0. 4 to about 1.5.

37. A method for making a colored contact lens, comprising the steps of: providing a mold comprising a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces; applying a transferable clear coating at least over a surface area of one of the two molding surfaces, where the iris section of the lens is formed; producing a colored film on the transferable clear coating, wherein the step of producing the colored film is performed by printing, in no particular order, an intermittent pattern of pearlescently colored elements with at least one pearlescent colorant and a dark limbal ring with a dark colorant free of pearlescent pigment on the surface area, wherein the intermittent pattern of pearlescently colored elements and the limbal ring are arranged over the surface area so as to cover from about 5% to about 90% of the iris section, wherein the limbal ring surrounds the intermittent pattern and has a substantially even circular border or an uneven border with the intermittent pattern, wherein the colored film contains a first surface exposed to the interior of the lens-forming cavity and a second surface in contact with the transferable clear coating; dispensing a lens-forming material into the lens-forming cavity; and curing the lens-forming material within the lens-forming cavity to form the contact lens, whereby the colored film and transferable clear coating detach from the molding surface and becomes integral with the body of the contact lens.

* * * * *